United States Patent [19]

Daimon et al.

[11] 4,255,299
[45] Mar. 10, 1981

[54] POLYMER CONTAINING PERFLUOROALKYL GROUP, PROCESS FOR PREPARING THE SAME AND COATING COMPOSITION

[75] Inventors: Shigeo Daimon, Osaka; Kazuo Okamura, Itami, both of Japan

[73] Assignee: Daikin Kogyo Co., Ltd., Osaka, Japan

[21] Appl. No.: 105,259

[22] Filed: Dec. 19, 1979

[30] Foreign Application Priority Data

Dec. 29, 1978 [JP] Japan .............................. 53-165300

[51] Int. Cl.³ .......................... C08F 8/24; C08F 8/18; C08F 222/06
[52] U.S. Cl. .................................. 260/17 R; 424/71; 424/78; 525/103; 525/117; 525/119; 525/143; 525/176; 525/183; 525/207; 525/328; 525/348; 525/359; 526/242
[58] Field of Search ............... 525/328, 348, 359, 117, 525/119, 103, 143, 176, 183, 207; 526/242

[56] References Cited

U.S. PATENT DOCUMENTS

| | | | |
|---|---|---|---|
| 3,250,734 | 5/1966 | Sekmakas | 260/23 |
| 3,876,589 | 4/1975 | Wasley et al. | 260/78.5 T |

FOREIGN PATENT DOCUMENTS 1290367  9/1972  United Kingdom .

Primary Examiner—Earl A. Nielsen
Attorney, Agent, or Firm—Armstrong, Nikaido, Marmelstein & Kubovcik

[57] ABSTRACT

A polymer containing perfluoroalkyl group in its side chain which is an addition reaction product of a polymer having the following general formula:

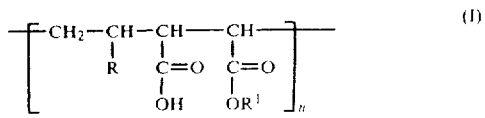

wherein R is phenyl group or alkoxyl group having 1 to 12 carbon atoms, $R^1$ is alkyl group having 1 to 12 carbon atoms, and n is an integer of 10 to 2,000, with an epoxy compound selected from the group consisting of

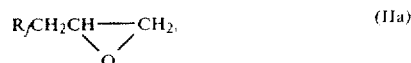

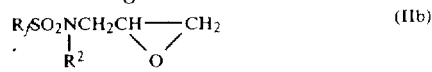

and

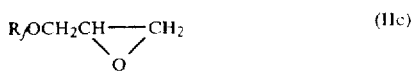

wherein $R_f$ is perfluoroalkyl group having 3 to 20 carbon atoms and $R^2$ is alkyl group having 1 to 12 carbon atoms, the addition reaction product containing 0.1 to 50% by mole of the group derived from the epoxy compound having the formulae (IIa) to (IIc) per 1 mole of the recurring unit of the polymer having the formula (I). The polymer is good in compatibility with film-forming resins and solvents and improves the leveling property of a coating composition when incorporated thereinto and the surface smoothness of the film obtained from the composition.

6 Claims, No Drawings

POLYMER CONTAINING PERFLUOROALKYL GROUP, PROCESS FOR PREPARING THE SAME AND COATING COMPOSITION

BACKGROUND OF THE INVENTION

The present invention relates to a novel polymer containing perfluoroalkyl group in its side chain, and the preparation and use thereof.

These are known various kinds of coating compositions such as paints, protective coating compositions, and hair styling compositions. Generally the coating composition is mainly composed of a film-forming resin and a solvent and applied to a foundation to give a film.

British Pat. No. 1,290,367 discloses a polyer containing perfluoroalkyl group in its side chain used as a film-forming resin for hair styling compositions. The polymer is a reaction product of a copolymer of maleic anhydride and vinyl ether with a compound containing perfluoroalkyl group. In the British patent, there is described that the polymer has an improved balance of properties between the requirements of softness and curl retention and gives a good holding power at relatively high humidities. However, the polymer is remarkably poor in compatibility with film-forming resins and solvents. Accordingly the polymer does not give a sufficient result with respect to the smoothness of the film surface unless it is used alone.

OBJECTS OF THE INVENTION

An object of the present invention is to provide a novel polymer containing perfluoroalkyl group in its side chain used in admixture with a film-forming resin in a coating composition which is good in compatibility with film-forming resins and solvents to give a coating composition having excellent leveling property and storage stability, and improves the smoothness of the surface of the film of the composition with preventing the film from unfavorable phenomena such as orange peel and whitening.

A further object of the invention is to provide a process for preparing the novel polymer.

A still further object of the invention is to provide a coating composition containing the novel polymer in admixture with a film-forming resin.

These and other objects of the present invention will become more apparent from the description hereinafter.

DETAILED DESCRIPTION

The polymer of the present invention is an addition reaction product of a polymer having the following general formula:

$$\left[ -CH_2-CH-CH-CH- \atop {\overset{|}{R}} \quad {\overset{|}{\underset{OH}{C=O}}} \quad {\overset{|}{\underset{OR^1}{C=O}}} \right]_n \quad (I)$$

wherein R is phenyl group or alkoxy group having 1 to 12 carbon atoms, $R^1$ is alkyl group having 1 to 12 carbon atoms, and n is an integer of 10 to 2,000, with an epoxy compound selected from the group consisting of

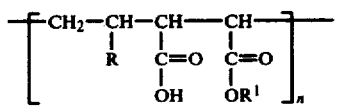

(IIa)

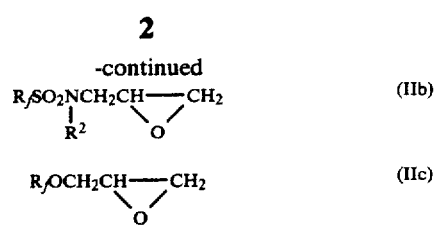

wherein $R_f$ is perfluoroalkyl group having 3 to 20 carbon atoms and $R^2$ is alkyl group having 1 to 12 carbon atoms, the addition reaction product containing 0.1 to 50% by mole of the group derived from the epoxy compound having the formulae (IIa) to (IIc) per 1 mole of the recurring unit of the polymer having the formula (I).

The polymer of the present invention is good in compatibility with the film-forming resins and solvents as described later which are used usually for coating compositions, and gives a coating composition having excellent leveling property and storage stability when incorporated into the coating composition. The film prepared from the composition is markedly improved in the smoothness of the film surface without unfavorable phenomena such as orange peel and whitening.

The polymer of the present invention is clearly distinct from the polymer of British Pat. No. 1,290,367 mentioned above in such a point that the polymer of the present invention contains the alkoxycarbonyl group containing no fluorine atom ($-COOR^1$ in the formula (I) ) as side chain together with the side chain containing perfluoroalkyl group, while the polymer of the British patent does not contain such an alkoxycarbonyl group as side chain. The polymer of the present invention is much better in compatibility with the above-mentioned film-forming resins and solvents than the polymer of the British patent due to the above structural distinction between both polymers. As a result, the polymer of the present invention gives a film having a markedly smooth surface when admixed with a film-forming resin, as compared to the polymer of the British patent.

Since the polymer of the present invention is prepared by the addition reaction of the carboxyl group of the polymer having the formula (I) and the epoxy group of the epoxy compound, the degree of polymerization of the polymer of the present invention is equal to the degree of polymerization "n" of the polymer having the formula (I) and therefore has a degree of polymerization of 10 to 2,000. The preferred degree of polymerization ranges from 50 to 1,500. When the degree of polymerization is less than the above range, the polymer tends to plasticize film-forming resins. When the degree of polymerization is more than the above range, the polymer is poor in compatibility with film-forming resins.

The polymer of the present invention contains 0.1 to 50% by mole, preferably 1 to 30% by mole of the group derived from the epoxy compound containing perfluoroalkyl group per 1 mole of the recurring unit of the polymer having the formula (I). When the content of the group derived from the epoxy compound is less than the above range, the polymer is poor in the effect of improving the smoothness of film surface. When the content of the group derived from the epoxy compound is more than the above range, the polymer is poor in compatibility with and solubility to coating compositions (film-forming resins and/or solvents).

The polymer of the formula (I) used in the present invention contains alkoxycarbonyl group containing no fluorine atom (—COOR$^1$) and free carboxyl group (—COOH) as side chains. Examples of such a polymer include copolymers of vinyl ether and maleic acid monoalkyl ester which are the polymers of the formula (I) in which R is alkoxy group having 1 to 12 carbon atoms, and copolymers of styrene and maleic acid monoalkyl ester which are the polymers of the formula (I) in which R is phenyl group. Examples of the alkoxy group represented by R in the formula (I) are methoxy, ethoxy, propoxy and butoxy. Examples of the alkyl group represented by R$^1$ in the formula (I) are methyl, ethyl, propyl and butyl.

The preferred polymer of the formula (I) is that in which R is alkoxyl group having 1 to 4 carbon atoms, R$^1$ is alkyl group having 1 to 4 carbon atoms, and n is an integer of 50 to 1,500.

The epoxy compound used in the present invention is the compounds of the formulae (IIa), (IIb) and (IIc). Examples of the perfluoroalkyl group represented by R$_f$ in the formulae (IIa) to (IIc) are perfluoropropyl, perfluorobutyl, perfluoropentyl, perfluorohexyl, perfluorooctyl, perfluorononyl and perfluorodecyl. The preferred perfluoroalkyl group has 3 to 10 carbon atoms. Examples of the alkyl group represented by R$^2$ in the formula (IIb) are methyl, ethyl, propyl, butyl, hexyl, octyl and dodecyl. The preferred alkyl group has 1 to 3 carbon atoms.

Typical examples of the epoxy compound are 3-perfluoropentyl-1,2-epoxypropane, 3-perfluorononyl-1,2-epoxypropane, 3-perfluorodecyl-1,2-epoxypropane, 3-[N-(ethyl)-perfluorooctanesulfonamido]-1,2-epoxypropane, 3-[N-(propyl)perfluorooctanesulfonamido]-1,2-epoxypropane, perfluoroisopropyl glycidyl ether and perfluoropentyl glycidyl ether.

The polymer of the present invention is prepared by subjecting the polymer of the formula (I) to addition reaction with the epoxy compound. In the addition reaction, the carboxyl group contained in the polymer of the formula (I) reacts with the epoxy group contained in the epoxy compound of the formulae (IIa) to (IIc) according to the following reaction scheme:

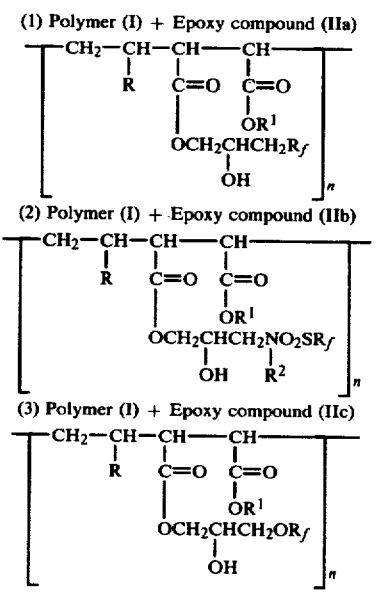

The addition reaction is preferably carried out in the presence of a tertiary amine or a quaternary ammonium salt as catalyst in order to increase the conversion rate of the epoxy compound containing perfluoroalkyl group which is expensive. The preferred examples of the tertiary amine are triethyl amine, diaza-bicycloundecene and diaza-bicyclononane. The preferred examples of the quaternary ammonium salt are trimethylbenzylammonium chloride and trimethylhexadecylammonium chloride. Usually the addition reaction is carried out in a solvent capable of dissolving the polymer of the formula (I) and the epoxy compound as starting materials, and the formed polymer. Examples of the solvent are alcohols having a boiling point of 40° to 200° C. such as methanol, ethanol, isopropanol and butanol, and ketones having a boiling point of 40° to 200° C. such as acetone, methyl ethyl ketone and methyl isobutyl ketone. As the solvent, the alcohols are preferable since the addition reaction proceeds smoothly. When a polymer with a high content of the group derived from the epoxy compound is desired, there are preferably employed mixed solvents of the foregoing alcohols or ketones and fluorine-containing solvents such as benzotrifluoride, hexafluoro-m-xylene, trichlorotrifluoroethane and tetrachlorodifluoroethane. As the reaction temperature, higher temperatures are preferable since the reaction is completed for shorter times. Usually, however, temperatures around the reflux temperature of the solvent used, such as 40° to 200° C. are adopted.

In the present invention, the desired polymer containing perfluoroalkyl group is satisfactorily obtained by the addition reaction employing the reaction catalyst as described above.

The polymer of the present invention containing perfluoroalkyl group in its side chain is particularly useful as an additive for coating compositions. That is, when the polymer of the present invention is used in admixture with a film-forming resin to give a film, the leveling property of the film-forming resin in coating is improved, which results in the improvements of the thickness uniformity and the smoothness of the film and further the gloss and the homogenity of the film.

The present invention further provides a coating composition comprising at least one of the instant polymer containing perfluoroalkyl group in its side chain as specified above and a film-forming resin. The coating composition of the present invention is prepared in a usual manner, for example, by mixing the instant polymer with the film-forming resin or by dissolving or swelling the instant polymer and the film-forming resin in an appropriate solvent. The coating composition of the present invention is used in various forms such as solution, powder and aerosol according to the individual uses thereof.

Examples of the film-forming resin used in the present invention are epoxy resins such as reaction products of epichlorohydrin and polyhydric phenols (e.g. bisphenol A) which contain at least two epoxy groups per 1 molecule and are liquid at a normal temperature or solid having a melting point of not more than 160° C.; acrylic resins such as homopolymers or copolymers of acrylic monomers (e.g. 2-hydroxyethyl methacrylate, N-butoxy-methylacrylamide, glycidyl methacrylate, methyl methacrylate, butyl methacrylate, lauryl methacrylate, butyl acrylate, diacetone acrylic acid, acrylic acid and methacrylic acid), and copolymers of the foregoing acrylic monomers and vinyl monomers (e.g. ethylene, vinyl acetate and vinyl chloride); alkyd resins such as polycondensation products of polybasic acids (e.g. phthalic anhydride, isophthalic acid and maleic acid) and polyols (e.g. glycerin), and the foregoing polycondensation products modified with drying oil, rosin, phenolic resin, silicone resin or vinyl monomer (e.g. vinyltoluene); polyamides such as polyamides having the following formula: $+NH-R^3-CO+_{\overline{m}}$ wherein $R^3$ is alkylene group having 4 to 12 carbon atoms (e.g. pentamethylene), and polyamides having the following formula:

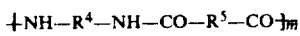

wherein $R^4$ is alkylene group having 4 to 12 carbon atoms (e.g. hexamethylene), and $R^5$ is alkylene group having 4 to 12 carbon atoms (e.g. tetramethylene); cellulose derivatives such as nitrocellulose, cellulose acetate, benzyl cellulose and ethyl cellulose; homopolymers of alkyl vinyl ether (in which alkyl group has 1 to 4 carbon atoms), copolymers of the foregoing alkyl vinyl ether and maleic acid monoalkyl ester (in which alkyl group has 1 to 4 carbon atoms), and copolymers of ethylene and the foregoing maleic acid monoalkyl ester; and copolymers of vinylpyrrolidone and at least one of vinyl acetate, styrene, vinyl chloride, vinylidene chloride and ethylene. The instant polymer is usually used in an amount of 0.05 to 2 parts (parts by weight, the same as hereinafter) per 100 parts of the film-forming resin. When the amount of the instant polymer is more than the above range, the resulting composition becomes turbid in some cases. When the amount of the instant polymer is less than the above range, the marked effects of the instant polymer are not exhibited. Examples of the solvent are methanol, ethanol, isopropanol, butanol, toluene, xylene, ethyl acetate, butyl acetate, methyl ethyl ketone and ethylene glycol ethyl ether, and mixtures thereof.

The composition of the present invention may contains further other additives such as pigments, plasticizers, perfumes, dyes and surface active agents depending upon the individual uses thereof.

The composition of the present invention is suitably employed for various uses such as paints, protective coating compositions and hair styling compositions.

Besides the usefulness as an additive for coating compositions as described above, the polymer of the present invention has other interesting uses. For example, the polymer modified with amines is used as a sizing agent for papers, and the polymer in admixture with proteins or synthetic surface active agents is used as a foam fire extinguisher.

The present invention is more particularly described and explained by means of the following non-limiting Examples in which % is % by weight unless otherwise noted.

EXAMPLE 1

Into a 500 ml. four-necked flask equipped with a thermometer, an agitater and a reflux condenser was added 20.2 g. of an alternate copolymer of methyl vinyl ether and monoethyl maleate having a molecular weight of about $2.1 \times 10^5$ (available under the commercial name "Gantrez ES-225" in the form of a 50% ethanol solution, made by GAF Corporation). Thereto were added 5.26 g. of 3-perfluorononyl-1,2-epoxypropane, 0.1 g. of triethanolamine and 250 g of ethanol. The mixture was agitated under reflux (80° C.) for 16 hours. After the completion of the reaction, the ethanol was distilled off under a reduced pressure with heating 80° to 95° C. to give a solid crude product. The product was extracted with three 500 g. portions of hot trichlorotrifluoroethane (about 47° C.) to remove the unchanged epoxy compound. The purified polymer was dried in a vacuum desiccator at a room temperature for 24 hours.

The infrared spectrum of the obtained polymer was different from that of the copolymer of methyl vinyl ether and monoethyl maleate used as starting material and indicated a peak due to perfluoroalkyl group at 1,260 cm.$^{-1}$. The elementary analysis of the polymer indicated that it contained 21.05% of fluorine, from which it was evaluated that the polymer contained 18% by mole of the group derived from the epoxy compound per 1 mole of the recurring unit of the starting copolymer.

EXAMPLE 2

The same procedures as in Example 1 except that 23.0 g. of an alternate copolymer of methyl vinyl ether and monobutyl maleate having a molecular weight of about $2.5 \times 10^5$ (available under the commercial name "Gantrez ES-425" in the form of a 50% ethanol solution, made by GAF Corporation) was used instead of the alternate copolymer of methyl vinyl ether and monoethyl maleate and the amount of 3-perfluorononyl-1,2-epoxypropane was changed to 2.63 g. were repeated to give a polymer.

The infrared spectrum of the obtained polymer was different from that of the copolymer of methyl vinyl ether and monobutyl maleate used as starting material and indicated a peak due to perfluoroalkyl group at 1,260 cm.$^{-1}$. The elementary analysis of the polymer indicated that it contained 10.1% of fluorine, from which it was evaluated that the polymer contained 7.5% by mole of the group derived from the epoxy compound per 1 mole of the recurring unit of the starting copolymer.

EXAMPLE 3

In a 500 ml. four-necked flask equipped with a thermometer, an agitater and a reflux condenser were added 20.2 g. of an alternate copolymer of styrene and maleic anhydride having a molecular weight of about $1.0 \times 10^5$ (which was prepared by the method described in Dr. H. Cherdron et al., "Kobunshi Kagaku Jikkenho," page 161 (Experimetal No. 346), Asakura-Shoten, Tokyo, 1968, in Japanese) and 250 g. of ethanol. The mixture was agitated under reflux (80° C.) for 3 hours. In that stage, it was confirmed by infrared analysis that the starting copolymer was converted to a half ester. To the mixture were then added 58.3 g. of 3-[N-(ethyl)perfluorooctanesulfonamido]-1,2-epoxypropane and 0.2 g. of triethylamine. The resulting mixture was agitated under reflux for 16 hours. After the completion of the reaction, the ethanol was distilled off, followed by purification by extraction with hot trichlorotrifluoroethane and drying in the same manner as in Example 1 to give a polymer.

The infrared spectrum of the obtained polymer indicated a peak due to perfluoroalkyl group at 1,260 cm.$^{-1}$. The elementary analysis of the polymer indicated that it contained 8.7% of fluorine, from which it was evaluated that the polymer contained 8.0% by mole of the group derived from the epoxy compound per 1 mole of the recurring unit of the starting copolymer.

EXAMPLE 4

The same procedures as in Example 1 except that 13.6 g. of an alternate copolymer of butyl vinyl ether and monobutyl maleate having a molecular weight of about $2.0 \times 10^5$ (which was prepared according to the method described in the above-mentioned literature) was instead of the alternate copolymer of methyl vinyl ether and monoethyl maleate and the amount of 3-perfluorononyl-1,2-epoxypropane was changed to 7.9 g. were repeated to give a polymer.

The infrared spectrum of the obtained polymer indicated a peak due to perfluoroalkyl group at 1,260 cm.$^{-1}$. The elementary analysis of the polymer indicated that the polymer contained 24.1% of fluorine, from which it was evaluated that the polymer contained 28.0% by mole of the group derived from the epoxy compound per 1 mole of the recurring unit of the starting copolymer.

EXAMPLE 5 AND COMPARATIVE EXAMPLE 1

To 100 parts of liquid epoxy resin (molecular weight: about 380, epoxy equivalent: 184 to 194, available under the commercial name "Epikote 828" made by Shell Kagaku Kabushiki Kaisha) were added 10 parts of diethylenetriamine as curing agent and 0.2 part of the polymer obtained in Example 2 to give a coating composition.

For the purpose of comparison, 100 parts of the same epoxy resin as above was mixed only with 10 parts of diethylenetriamine to give a coating composition.

Each composition was applied onto a polypropylene film by a bar coater and dried at a room temperature to give a film of 0.1 mm. in thickness. The smoothness of the obtained film was observed by the naked eye. The results thereof are shown in Table 1.

TABLE 1

| | Composition (parts) | | | |
|---|---|---|---|---|
| | Epoxy resin | Diethylene-triamine | Polymer of Ex. 2 | Appearance of film |
| Ex. 5 | 100 | 10 | 0.2 | Smooth |
| Com. Ex. 1 | 100 | 10 | 0 | Wave-like |

As is clear from Table 1, the conventional amine curing type epoxy resin composition (Comparative Example 1) tended to be repelled on the foundation since the composition had a higher surface tension than that of the foundation, and therefore did not give a film having a smooth surface but a film having a wave-like surface. To the contrary, the composition of the present invention (Example 5) in which the instant polymer was incorporated into the conventional amine curing type epoxy resin (Comparative Example 1) gave a film having a smooth surface.

EXAMPLES 6 TO 8

To each of the film-forming resins shown in Table 2 was added the polymer obtained in Example 1 in an amount of 0.1%. The mixture was dissolved into the solvent shown in Table 2 to give a 5% solution.

The solution was applied onto a glass plate having a dimension of 5 cm. × 20 cm. for thin layer chromatography and dried at a room temperature. The transparency and the smoothness of the obtained film were observed. The results thereof are shown in Table 2. The compatibility of the instant polymer with the film-forming resins was evaluated from the results.

TABLE 2

| Ex. No. | Film-forming resin | Solvent | Film Transparency | Smoothness |
|---|---|---|---|---|
| 6 | Soluble nylon CM-8000 (Note 1) | Ethanol | Transparent | Good |
| 7 | Acrylic resin (Note 2) | Methyl ethyl ketone | Transparent | Good |
| 8 | Ethyl cellulose | Ethanol | Transparent | Good |

Note 1: made by Toray Kabushiki Kaisha
Note 2: made by Daidou Kasei Kogyo Kabushiki Kaisha As is clear from Table 2, the films of the film-forming resins admixed with the instant polymer were neither whitened nor became turbid, which revealed that the instant polymer was good in compatibility with the film-forming resins

EXAMPLES 9 TO 11 AND COMPARATIVE EXAMPLES 2 TO 4

To each of three kinds of the commercially available hair styling agent shown in Table 3 was added the polymer obtained in Example 1 in an amount of 0.1%. The mixture was dissolved into ethanol to give a 5% solution.

One gram of the solution was accurately weighed and put into a laboratory dish of 2.25 cm. in diameter. The dish was allowed to stand at 19° C. at a relative humidity of 60%. The amount of the solvent (ethanol) vaporized was determined after the times shown in Table 3 proceeded.

For the purpose of comparison, a 5% ethanol solution of each of the same hair styling agents as used above was prepared without employing the instant polymer. With the ethanol solution, the amount of the solvent vaporized was determined in the same manner as above. The results thereof are shown in Table 3.

TABLE 3

| | Hair styling agent | Instant polymer | Amount of solvent vaporized (g.) After 33 min. | After 59 min. | After 111 min. |
|---|---|---|---|---|---|
| Ex. 9 | Plascize L-53P (Note 1) | Added | 0.22 | 0.35 | 0.67 |
| Com. Ex. 2 | Plascize L-53P (Note 1) | Not added | 0.22 | 0.39 | 0.85 |
| Ex. 10 | MVE-MBM copolymer neutralized with AMPD (Note 2) | Added | 0.22 | 0.33 | 0.57 |
| Com. Ex. 3 | MVE-MBM copolymer neutralized with AMPD (Note 2) | Not added | 0.27 | 0.39 | 0.72 |
| Ex. 11 | Vinylpyrrolidone-vinyl acetate copolymer | Added | 0.23 | 0.36 | 0.59 |
| Com. Ex. 4 | Vinylpyrrolidone-vinyl acetate copolymer | Not added | 0.26 | 0.48 | 0.89 |

Note 1:
Commercial name of a product prepared by neutralizing an acidic copolymer of acrylic acid, acrylates such as butyl acrylate and diacetone acrylic acid, and methacrylates such as methyl methacrylate, butyl methacrylate and lauryl methacrylate, with 2-amino-2-methyl-1-propanol, made by Goo Kagaku Kogyo Kabushiki Kaisha
Note 2:
Product prepared by neutralizing a copolymer of methyl vinyl ether and monobutyl maleate with 2-amino-2-methyl-1,3-propanediol to an extent of 25%.

As is clear from Table 3, in the case of the compositions employing the instant polymer in admixture with the conventional hair styling agent (Examples 9 to 11), the solvent therein hardly vaporized in comparison with the compositions employing no instant polymer (Comparative Examples 2 to 4). As a result, in preparing a film from the composition of the present invention, the leveling of the composition is suitably controlled.

EXAMPLE 12 AND COMPARATIVE EXAMPLES 5 TO 7

To the above-mentioned commercially available hair styling agent, Plascize L-53P, was added the polymer obtained in Example 4 in an amount of 0.05%. The mixture was dissolved in ethanol to give a 5% solution.

For the purpose of comparison, Plascize L-53P was admixed with polyoxyethylene(10) cetyl ether (Note: the numerical value in parentheses means average number of moles of added ethylene oxide per 1 mole of alcohol) as surface active agent in an amount of 5% and the mixture was dissolved in ethanol to give a 5% solution (Comparative Example 5). Plascize L-53P was admixed with polyoxyethylene(20) sorbitol monolaurate as surface active agent in an amount of 10% and the mixture was dissolved in ethanol to give a 5% solution (Comparative Example 6). Plascize L-53P was dissolved in ethanol to give a 5% solution (Comparative Example 7).

Each of the solutions and a mixed propellent of dichlorodifluoromethane and trichloromonofluoromethane (70:30 by weight) were charged in a container for aerosol in a ratio of the solution to the propellent of 40:60 by weight to give a hair spray for hair styling.

Employing the obtained hair spray, the hair styling composition was sprayed onto a glass plate having a dimension of 5 cm.×20 cm. for thin layer chromatography for 2 seconds and dried at a room temperature for 24 hours. The smoothness of the surface of the obtained film was observed and the hardness of the film was determined at 21° C. at a relative humidity of 54% according to Sward Rocker hardness test in which the hardnesses of a polished sheet glass and a polymethyl methacrylate plate are prescribed 50 and 20, respectively. The results thereof are shown in Table 4.

TABLE 4

| | Component mixed with Plascize L-53P | | Film | |
|---|---|---|---|---|
| | Kind | Amount (%) | Smoothness | Hardness |
| Ex. 12 | Polymer of Ex. 4 | 0.05 | Smooth | 24 |
| Com. Ex. 5 | Polyoxyethylene(10) cetyl ether | 5 | Wave-like | 21 |
| Com. Ex. 6 | Polyoxyethylene(20) sorbitol monolaurate | 10 | Wave-like | 17 |
| Com. Ex. 7 | — | — | Wave-like | 23 |

As is clear from Table 4, the film prepared from the composition employing the instant polymer in combination with the commercially available hair styling agent (Example 12) was markedly good in smoothness and beautifulness without whitening and wave-like surface and had a proper hardness, in comparison with the films prepared from the composition employing only the commercially available hair styling agent (Comparative Example 7) and the compositions employing the hair styling agent and the additive other than the instant polymer (Comparative Examples 5 to 6).

What we claim is:

1. A polymer containing perfluoroalkyl groups in its side chains which is an addition reaction product of a polymer having the following general formula:

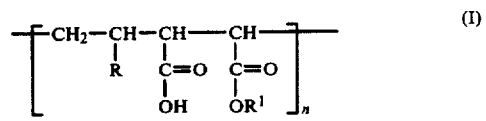

wherein R is a phenyl group or alkoxyl group having 1 to 12 carbon atoms, $R^1$ is an alkyl group having 1 to 12 carbon atoms, and n is an integer of 10 to 2,000, with an epoxy compound selected from the group consisting of

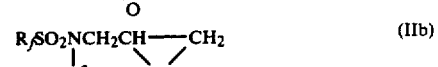

and

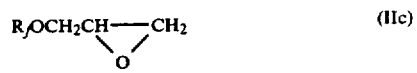

wherein $R_f$ is a perfluoroalkyl group having 3 to 20 carbon atoms and $R^2$ is an alkyl group having 1 to 12 carbon atoms, the addition reaction product containing 0.1 to 50% by mole of the group derived from the epoxy compound per 1 mole of the recurring unit of the polymer having the formula (I).

2. The polymer of claim 1, in which the polymer of the formula (I) is that in which R is an alkoxyl group having 1 to 4 carbon atoms, $R^1$ is an alkyl group having 1 to 4 carbon atoms, and n is an integer of 50 to 1,500, and the epoxy compound is one member selected from the group consisting of the compounds of the formulae (IIa), (IIb) and (IIc) wherein $R_f$ is a perfluoroalkyl group having 3 to 10 carbon atoms and $R^2$ is an alkyl group having 1 to 3 carbon atoms, the addition reaction product containing 1 to 30% by mole of the group derived from the epoxy compound per 1 mole of the recurring unit of the polymer having the formula (I).

3. A process for preparing a polymer having perfluoroalkyl groups in its side chains which comprises reacting a polymer having the following general formula:

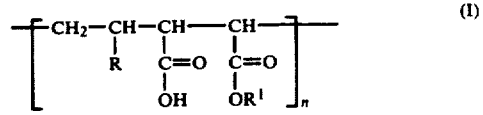

wherein R is a phenyl group or an alkoxyl group having 1 to 12 carbon atoms, $R^1$ is an alkyl group having 1 to 12 carbon atoms, and n is an integer of 10 to 2,000, with an epoxy compound selected from the group consisting of

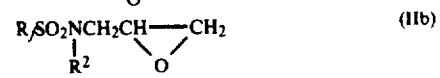

and

-continued

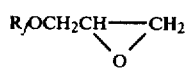 (IIc)

wherein $R_f$ is a perfluoroalkyl group having 3 to 20 carbon atoms and $R^2$ is an alkyl group having 1 to 12 carbon atoms, in the presence of a tertiary amine or a quaternary ammonium salt so that the obtained reaction product contains 0.1 to 50% by mole of the group derived from the epoxy compound per 1 mole of the recurring unit of the polymer having the formula (I).

4. A coating composition comprising a film-forming resin and an effective amount of a polymer containing perfluoroalkyl groups in its side chains which is an addition reaction product of a polymer having the following general formula:

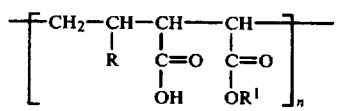 (I)

wherein R is a phenyl group or an alkoxyl group having 1 to 12 carbon atoms, $R^1$ is an alkyl group having 1 to 12 carbon atoms, and n is an integer of 10 to 2,000, with an epoxy compound selected from the group consisting of

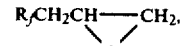 (IIa)

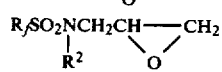 (IIb)

and

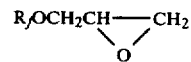 (IIc)

wherein $R_f$ is a perfluoroalkyl group having 3 to 20 carbon atoms and $R^2$ is an alkyl group having 1 to 12 carbon atoms, the addition reaction product containing 0.1 to 50% by mole of the group derived from the epoxy compound per 1 mole of the recurring unit of the polymer having the formula (I).

5. The coating composition of claim 4, in which the polymer containing perfluoroalkyl groups is an addition reaction product of the polymer of the formula (I) in which R is an alkoxyl group having 1 to 4 carbon atoms, $R^1$ is an alkyl group having 1 to 4 carbon atoms, and n is an integer of 50 to 1,500, with the epoxy compound selected from the group consisting of the compounds of the formulae (IIa), (IIb) and (IIc) wherein $R_f$ is a perfluoroalkyl group having 3 to 10 carbon atoms and $R^2$ is an alkyl group having 1 to 3 carbon atoms, the addition reaction product containing 1 to 30% by mole of the group derived from the epoxy compound per 1 mole of the recurring unit of the polymer having the formula (I).

6. The coating composition of claim 4, in which the polymer containing perfluoroalkyl groups is used in an amount of 0.05 to 2 parts by weight per 100 parts by weight of the film-forming resin.

* * * * *